(12) United States Patent
Van Straelen

(10) Patent No.: US 8,926,927 B2
(45) Date of Patent: Jan. 6, 2015

(54) PROCESS FOR THE REMOVAL OF CARBON DIOXIDE FROM A GAS

(75) Inventor: Jiri Peter Thomas Van Straelen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 961 days.

(21) Appl. No.: 12/999,449

(22) PCT Filed: Jun. 19, 2009

(86) PCT No.: PCT/EP2009/057697
§ 371 (c)(1),
(2), (4) Date: Jan. 31, 2011

(87) PCT Pub. No.: WO2009/153351
PCT Pub. Date: Dec. 23, 2009

(65) Prior Publication Data
US 2011/0116998 A1    May 19, 2011

(30) Foreign Application Priority Data
Jun. 19, 2008    (EP) .................................... 08158590

(51) Int. Cl.
*B01D 53/62*    (2006.01)
*B01D 53/78*    (2006.01)
*B01D 53/96*    (2006.01)
*B01D 53/14*    (2006.01)

(52) U.S. Cl.
CPC ............. *B01D 53/1475* (2013.01); *Y02C 10/04* (2013.01); *Y02C 10/06* (2013.01); *B01D 2251/606* (2013.01); *B01D 53/1493* (2013.01)
USPC .......................................... 423/232; 423/220

(58) Field of Classification Search
USPC .................................................. 423/220, 232
See application file for complete search history.

(56) References Cited

U.S. PATENT DOCUMENTS

| 4,152,217 A |   | 5/1979  | Eisenberg et al. |         |
|-------------|---|---------|------------------|---------|
| 4,251,494 A |   | 2/1981  | Say              |         |
| 4,271,132 A |   | 6/1981  | Eickmeyer        | 423/223 |
| 4,415,032 A | * | 11/1983 | Shu              | 166/402 |
| 4,581,209 A |   | 4/1986  | Oswald et al.    | 423/223 |

(Continued)

FOREIGN PATENT DOCUMENTS

| EP | 165758  | 12/1985 |
| EP | 1695756 | 8/2006  |

(Continued)

*Primary Examiner* — Stanley Silverman
*Assistant Examiner* — Daniel Berns

(57) ABSTRACT

A process for the removal of $co_2$ from a gas comprising the steps of: (a) contacting the gas (1) in an absorber (2) with an aqueous solution of one or more carbonate compounds in the presence of an accelerator, thereby reacting at least part of the $co_2$ to form a bicarbonate compound, under conditions such that at least a part of the bicarbonate compound formed precipitates, forming a bicarbonate slurry; (b) subjecting at least part of the bicarbonate slurry to a concentration step (5) to obtain an aqueous solution (6) and a concentrated bicarbonate slurry (7), wherein the concentrated bicarbonate slurry comprises from 20 to 80 wt % of bicarbonate compounds; (c) returning at least part of the aqueous solution to the absorber; (d) pressurising (8) the concentrated bicarbonate slurry, (e) transferring the pressurized concentrated bicarbonate slurry to a regenerator (12) and applying heat to obtain a $co_2$-rich gas stream (13) and a regenerated carbonate stream (14).

12 Claims, 1 Drawing Sheet

(56) References Cited

U.S. PATENT DOCUMENTS

| | | | |
|---|---|---|---|
| 5,603,908 A | 2/1997 | Yoshida et al. | |
| 5,832,712 A | 11/1998 | Ronning et al. | |
| 6,036,888 A | 3/2000 | Minevski | |
| 6,203,599 B1 | 3/2001 | Schubert et al. | |
| 2005/0132884 A1 | 6/2005 | Xu et al. | |
| 2006/0032377 A1 | 2/2006 | Reddy et al. | |
| 2007/0163443 A1 | 7/2007 | Moriyama et al. | |
| 2007/0283813 A1 | 12/2007 | Iijima et al. | |
| 2008/0223214 A1 | 9/2008 | Palamara et al. | |
| 2010/0229723 A1 | 9/2010 | Gelowitz et al. | |
| 2012/0132443 A1* | 5/2012 | Van Straelen | 166/402 |

FOREIGN PATENT DOCUMENTS

| | | | |
|---|---|---|---|
| EP | 1813343 | 8/2007 | |
| FR | 2898284 | 3/2010 | |
| WO | WO2006022885 | 3/2006 | ............. B01D 53/14 |
| WO | WO2006134225 | 12/2006 | ............. B01D 53/62 |
| WO | WO2008072979 | 6/2008 | ............. B01D 53/14 |
| WO | 2008099252 | 8/2008 | |
| WO | 2008144918 | 12/2008 | |
| WO | 2009112518 | 9/2009 | |
| WO | 2010146167 | 12/2010 | |

* cited by examiner

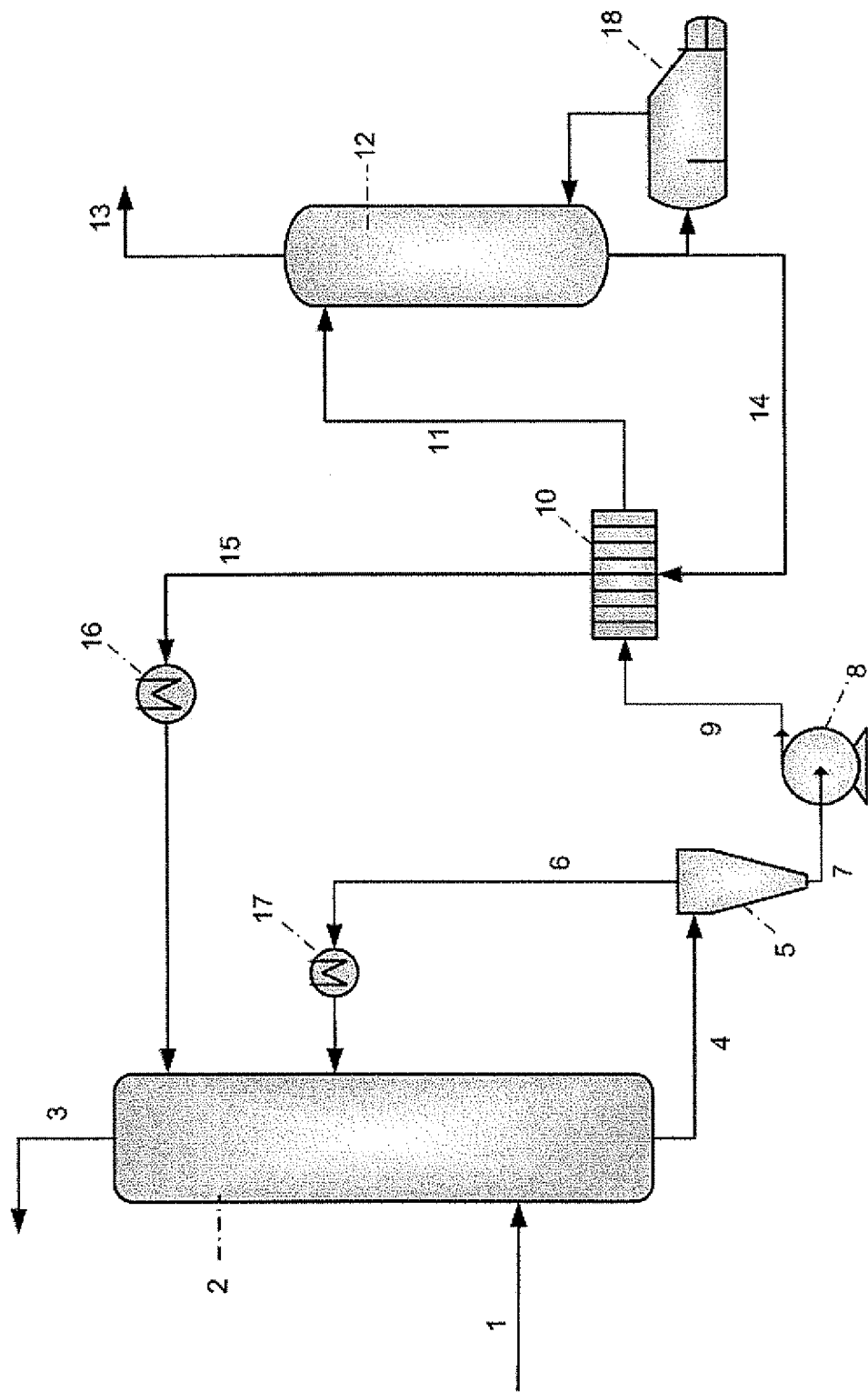

PROCESS FOR THE REMOVAL OF CARBON DIOXIDE FROM A GAS

The present application claims priority from European Patent Application 08158590.3 filed 19 Jun. 2008.

FIELD OF THE INVENTION

The invention relates to a process for removal of carbon dioxide ($CO_2$) from a gas.

BACKGROUND OF THE INVENTION

During the last decades there has been a substantial global increase in the amount of $CO_2$ emission to the atmosphere. Emissions of $CO_2$ into the atmosphere are thought to be harmful due to its "greenhouse gas" property, contributing to global warming. Following the Kyoto agreement, $CO_2$ emission has to be reduced in order to prevent or counteract unwanted changes in climate. The largest sources of $CO_2$ emission are combustion of fossil fuels, for example coal or natural gas, for electricity generation and the use of petroleum products as a transportation and heating fuel. These processes result in the production of gases comprising $CO_2$. Thus, removal of at least part of the $CO_2$ prior to emission of these gases into the atmosphere is desirable.

Processes for removal of $CO_2$ are known in the art.

For example, in WO 2006/022885, a process for removal of $CO_2$ from combustion gases is described, wherein an ammoniated slurry or solution is used. One disadvantage of the process described in WO 2006/022885 is that a volatile solvent, ammonia, is used. This will inevitably results in solvent losses. Another disadvantage is that the solvent needs to be cooled to relatively low temperatures, requiring cooling duty.

WO 2006/134225 describes a method and an apparatus for recovering $CO_2$ from flue gases, in which method the flue gases are washed with an alkali metal carbonate containing washing solution in a scrubber. The alkali metal bicarbonate concentration of the solution is increased to such a high level that crystalline alkali metal bicarbonate containing alkali metal bicarbonate slurry is formed.

Non-prepublished WO 2008/072979 describes a method for capturing $CO_2$ form exhaust gas in an absorber, wherein the $CO_2$ containing gas is passed through an aqueous absorbent slurry comprising an inorganic alkali carbonate, bicarbonate and at least one of an absorption promoter and a catalyst, wherein the CO2 is converted to solids by precipitation in the absorber. The slurry is conveyed to a separating device in which the solids are separated off.

There remains a need for a simple, energy-efficient process for removal of $CO_2$ from gases.

SUMMARY OF THE INVENTION

The invention provides a process for the removal of $CO_2$ from a gas comprising $CO_2$, the process comprising the steps of:
(a) contacting the gas in an absorber with an aqueous solution of one or more carbonate compounds in the presence of an accelerator, thereby reacting at least part of the $CO_2$ to form a bicarbonate compound, wherein the absorber is operated under conditions such that at least a part of the bicarbonate compound formed precipitates, forming a bicarbonate slurry;
(b) subjecting at least part of the bicarbonate slurry to a concentration step to obtain an aqueous solution and a concentrated bicarbonate slurry, wherein the concentrated bicarbonate slurry comprises in the range of from 20 to 80 wt % of bicarbonate compounds;
(c) returning at least part of the aqueous solution to the absorber;
(d) pressurising the concentrated bicarbonate slurry, to obtain a pressurised concentrated bicarbonate slurry;
(e) transferring the pressurised concentrated bicarbonate slurry to a regenerator system and applying heat to liberate $CO_2$ from the concentrated bicarbonate slurry to obtain a $CO_2$-rich gas stream and a regenerated carbonate stream.

The process enables removal of $CO_2$ from the gas to low levels, resulting in a purified gas, which can be emitted into the atmosphere.

An important advantage of the process is that the $CO_2$-rich stream is obtained at relatively high pressure. This facilitates the use of the $CO_2$-rich stream for enhanced oil recovery or for reinjection into a subterranean formation or aquifer, with less equipment needed for further compression of the $CO_2$-rich stream.

Still another advantage is that as regeneration takes place at elevated pressure the water content of the $CO_2$-rich gas stream exiting the regenerator is reduced. This reduces the regenerator condenser duty and also reduces the reboiler energy requirement.

Another important advantage is that an aqueous solution is used, having a relatively low volatility. The solvent losses will be much less compared to processes using more volatile solvents such as ammonia. The presence of an accelerator enhances the rate of absorption of $CO_2$ from the gas into the aqueous solution.

Yet another advantage is that the absorption can be done at temperatures in the range of from 20 to 80° C., thus enabling operating the process in areas with a high ambient temperature.

Furthermore, the kinetics of the process are more favourable when compared to processes using ammonia or ammonia-containing solvents.

A still further advantage of the process is that by forming a concentrated bicarbonate slurry comprising in the range of from 20 to 80 wt % of bicarbonate compounds, the concentrated bicarbonate slurry maintains a small liquid phase which allows the slurry to remain pumpable in conventional slurry pumps and allows one to avoid the use of more expensive and complex solids handling systems in the solids separation and regeneration step.

The process is especially suitable for flue gas streams.

BRIEF DESCRIPTION OF THE DRAWINGS

The invention is illustrated by the following FIGURE:
FIG. 1 schematically shows a process scheme for one embodiment according to the invention.

DETAILED DESCRIPTION OF THE INVENTION

An embodiment of the present invention will now be described by way of example only, and with reference to the accompanying non-limiting drawing in which:

FIG. 1 is a scheme of a process for the removal of $CO_2$ from a gas according to one embodiment of the invention. For the purpose of this description, a single reference number will be assigned to a line as well as stream carried in that line.

In step (a), the gas is contacted with an aqueous solution of one or more carbonate compounds in an absorber. The FIGURE shows a preferred embodiment wherein flue gas having a temperature of 40° C. and comprising about 8% of $CO_2$ is led via line 1 to absorber 2 where it is contacted with an aqueous solution of one or more carbonate compounds. In the absorber, $CO_2$ is reacted with the carbonate compounds to form bicarbonate compounds. The absorber is preferably operated at a temperature in the range of from 10 to 80° C., more preferably from 20 to 80° C. At least part of the bicarbonate compounds precipitate to form a bicarbonate slurry.

Treated gas, now comprising only 0.8% of $CO_2$ leaves the absorber via line 3. The bicarbonate slurry is withdrawn from the bottom of the absorber and led via line 4 to a concentrating device 5. In the concentrating device 5, aqueous solution is separated from the bicarbonate slurry and led back to the absorber via line 6. Before entering the absorber, the aqueous solution is cooled in heat exchanger 17. The obtained concentrated bicarbonate slurry comprises in the range of from 20 to 80 wt % of bicarbonate compounds, preferably in the range of from 30 to 70 wt % of bicarbonate compounds, and more preferably in the range from 35 to 65 wt % of bicarbonate compounds. The use of such a specific range of bicarbonate compounds allows the concentrated bicarbonate slurry to remain pumpable, without the necessity of complex solids handling processes. The resulting concentrated slurry is led from the concentrating device via line 7 and pressurised to a pressure of about 15 bar in pump 8. The pressurised concentrated bicarbonate slurry is led via line 9 to heat exchanger 10, where it is heated to a temperature of about 120° C. The heated concentrated bicarbonate slurry is led via line 11 to regenerator 12, where it is heated to release $CO_2$ from the slurry. Heat is supplied to the regenerator via reboiler 18. The released $CO_2$ is led from the regenerator via line 13 to a condenser (not shown) and led from the process as a $CO_2$-rich stream comprising about 99% of $CO_2$. A carbonate solution is led from the regenerator via line 14 to the heat exchanger 10, where it is cooled. The cooled carbonate solution is led via line 15 to lean solvent cooler 16 and led to the absorber.

In a further possible embodiment, the pressurised concentrated bicarbonate slurry can be led via line 9 into a sequence of multiple heat exchangers (not shown), where it is stepwise heated to a temperature of about 120° C. Preferably such a sequence of heat exchangers comprises a first heat exchanger, where the pressurised concentrated bicarbonate slurry is heated in a first step by exchanging heat with regenerated carbonate solution from line 14; a second heat exchanger, where the pressurised concentrated bicarbonate slurry is heated in a second step using heat from another source than the regenerated carbonate solution, for example heat from a hot flue gas, heat obtained from the regenerator condenser or heat obtained by interstage cooling from compressors; and/or a third heat exchanger, where the pressurised concentrated bicarbonate slurry is heated in a third step by exchanging heat with regenerated carbonate solution from line 14. When a third heat exchanger is used, the regenerated carbonate solution from line 14 may be initially heat exchanged in the third heat exchanger and subsequently in the first heat exchanger.

Using such a sequence of multiple heat exchangers has the advantage that an increased amount of energy and/or heat needed for the regenerator can be provided by the regenerated carbonate solution and an other source in the process line up, thereby allowing the reboiler 18 for the regenerator to be of a smaller size.

The process of the invention is especially suitable for flue gases.

Suitably, the partial pressure of $CO_2$ in the $CO_2$-comprising gas is in the range of from 30 to 400 mbar.

The carbonate compounds may be any carbonate compounds that react with $CO_2$. Preferred carbonate compounds include $Na_2CO_3$ or $K_2CO_3$ or a combination thereof, as these compounds are relatively inexpensive, commercially available and show favourable solubilities in water.

The aqueous solution of one or more carbonate compounds further comprises an accelerator to increase the rate of absorption of $CO_2$. Such an accelerator is also sometimes referred to as an activator compound. Suitable accelerators are compounds that enhance the rate of absorption of $CO_2$ from the gas into the liquid. Suitably, the accelerator is a primary or secondary amine, a vanadium-containing or a borate-containing compound or combinations thereof.

Preferably, the accelerator is one or more compounds selected from the group of vanadium-containing compounds, borate-containing compounds monoethanolamine (MEA) and saturated 5- or 6-membered N-heterocyclic compounds which optionally contain further heteroatoms. More preferably, the accelerator is one or more compounds selected from the group of MEA, piperazine, methylpiperazine and morpholine.

Suitably, the regenerator is operated at a temperature sufficiently high to ensure that a substantial amount of CO2 is liberated from the concentrated bicarbonate slurry. Preferably, the regenerator is operated at a temperature in the range of from 70 to 170° C. It will be understood that the regenerator is operated at a higher temperature than the absorber.

Preferably the regenerator is operated at elevated pressure, preferably in the range of from 1.0 to 50 bara, more preferably from 1.5 to 50 bara, still more preferably from 3 to 40 bara, even more preferably from 5 to 30 bara. It will be understood that the regenerator is operated at a higher pressure than the absorber.

Higher operating pressures for the regenerator are preferred because the $CO_2$-rich stream exiting the renegerator will then also be at a high pressure. Suitably, the gas stream rich in $CO_2$ is at a pressure in the range of from 1.5 to 50 bara, preferably from 3 to 40 bara, more preferably from 5 to 30 bara. In applications where the $CO_2$-rich gas stream needs to be at a high pressure, for example when it will be used for injection into a subterranean formation, it is an advantage that the $CO_2$-rich gas stream is already at an elevated pressure as this reduces the equipment and energy requirements needed for further pressurisation. In a preferred embodiment, the pressurised $CO_2$-rich gas stream is used for enhanced oil recovery, suitably by injecting it into an oil reservoir where it tends to dissolve into the oil in place, thereby reducing its viscosity and thus making it more mobile for movement towards the producing well.

Optionally, the gas stream rich in $CO_2$ is compressed to a pressure in the range of from 60 to 300 bara, more preferably from 80 to 300 bara. Normally, a series of compressors is needed to pressurise the $CO_2$-rich gas stream to the desired high pressures. A $CO_2$-rich gas stream which is already at elevated pressure is easier to further pressurise. Moreover, considerable capital expenditure is avoided because the first stage(s) of the compressor, which would have been needed to bring the $CO_2$-rich stream to a pressure in the range of 5 to 50 bara, is not necessary.

What is claimed is:

1. A process for the removal of $CO_2$ from a gas comprising $CO_2$, the process comprising the steps of:
   (a) contacting the gas in an absorber with an aqueous solution of one or more carbonate compounds in the presence of an accelerator, thereby reacting at least a part of the $CO_2$ to form a bicarbonate compound, wherein the absorber is operated under conditions such that at least a part of the bicarbonate compound formed precipitates, forming a bicarbonate slurry;

(b) subjecting at least a part of the bicarbonate slurry to a concentration step to obtain an aqueous solution and a concentrated bicarbonate slurry, wherein the concentrated bicarbonate slurry comprise in the range of from 20 to 80 wt % of bicarbonate compounds;

(c) returning at least a part of the aqueous solution to the absorber;

(d) pressurising the concentrated bicarbonate slurry, to obtain a pressurised concentrated bicarbonate slurry; and (e) transferring the pressurised concentrated bicarbonate slurry to a regenerator system and applying heat to liberate $CO_2$ from the concentrated bicarbonate slurry to obtain a $CO_2$-rich gas stream and a regenerated carbonate stream.

2. A process according to claim 1, wherein the one or more carbonate compounds include $Na_2CO_3$ or $K_2CO_3$ or a combination thereof.

3. A process according to claim 2, wherein the aqueous solution of one or more carbonate compounds in step a) comprises in the range of from 2 to 80 wt % of carbonate compounds.

4. A process according to claim 3, wherein the absorber is operated at a temperature in the range of from 10 to 80° C.

5. A process according to claim 4, wherein the process further comprises heating the pressurised concentrated bicarbonate slurry obtained in step (d) in a sequence of multiple heat exchangers before transferring the pressurised concentrated bicarbonate slurry to the regenerator system in step (e).

6. A process according to claim 5, wherein the sequence of multiple heat exchangers comprises a first heat exchanger, where the pressurised concentrated bicarbonate slurry is heated in a first step by exchanging heat with the regenerated carbonate solution obtained in step (e); a second heat exchanger, where the pressurised concentrated bicarbonate slurry is heated in a second step using heat from another source than the regenerated carbonate solution; and a third heat exchanger, where the pressurised concentrated bicarbonate slurry is heated in a third step by exchanging heat with the regenerated carbonate solution.

7. A process according to claim 6, wherein the accelerator comprises a compound selected from the group consisting of primary amines, secondary amines, vanadium-containing compounds, and borate containing compounds.

8. A process according to claim 7, wherein the partial pressure of $CO_2$ in the $CO_2$-comprising gas is in the range of from 30 to 400 mbar.

9. A process according to claim 8, wherein the regenerator is operated at a pressure in the range of from 1 to 500 bara.

10. A process according to claim 9, wherein the gas stream rich in $CO_2$ is compressed to a pressure in the range of from 60 to 300 bara.

11. A process according to claim 10, wherein the pressurised gas stream rich in $CO_2$ is injected into a subterranean formation.

12. A process according to claim 1, wherein the concentrated bicarbonate slurry comprises in the range of from 35 to 65 wt % of bicarbonate compounds.

* * * * *